Nov. 29, 1938.     F. W. TRABOLD     2,138,260
APPARATUS FOR PREPARING MEAT PRODUCTS
Filed Jan. 2, 1936
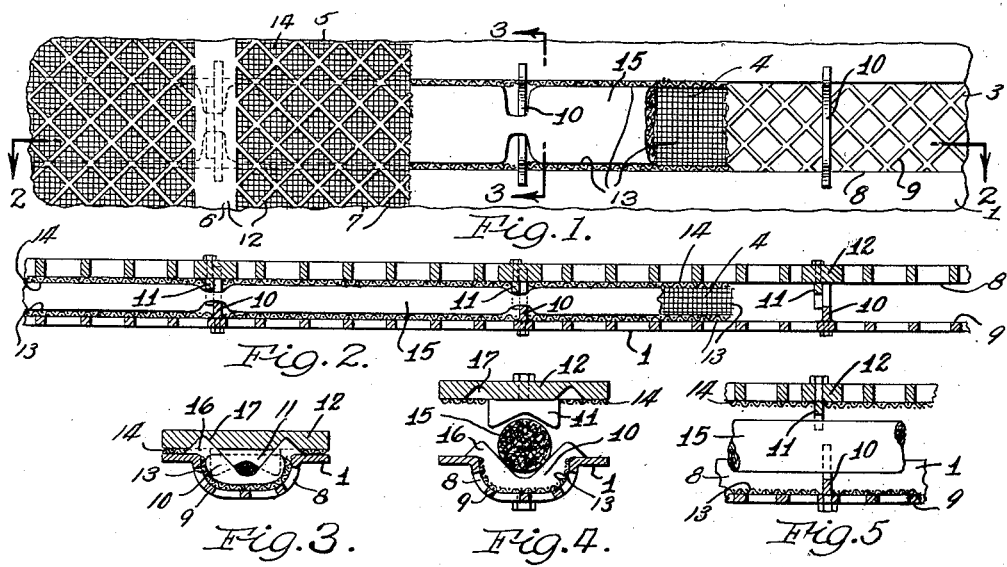
INVENTOR.
Frank W. Trabold,
BY
ATTORNEYS

UNITED STATES PATENT OFFICE 2,138,260

APPARATUS FOR PREPARING MEAT PRODUCTS

Frank W. Trabold, Detroit, Mich.

Application January 2, 1936, Serial No. 57,202

3 Claims. (Cl. 17—32)

This invention relates to the preparation of frankfurters or other similar food products and has for its object to provide an improved method and means for cooking, smoking and shaping the products.

It is a material advantage from a sales standpoint to be able to shape the product in a novel manner and with greater precision than is conventionally done. It is, therefore, an object of this invention to provide means for shaping the product and for subjecting it to cooking and smoking while maintaining a desired shape in order that it will hold that shape for marketing.

The cooking of frankfurters is best accomplished by steaming in such way that the steam directly contacts the frankfurter. It is, therefore, a specific object of this invention to provide a shaping device or mold such that the desired form may be imparted while permitting direct contact of steam with the contained product.

A source of considerable expense in the preparation of frankfurters is in the expense of handling in removing from the steaming chamber and inserting in the smoking chamber, or vice versa depending on the choice of the manufacturer. It is another object of this invention to provide a shaping device or mold which is equally suitable for subjecting the product to steaming and smoking and which can therefore be used for both purposes. Thus, for instance this mold device may be in the form of a series of individual pans or in the form of linked pans to form a conveyor chain. In either case, the mold device may be used in a chamber in which steam is introduced for a predetermined time and then smoke is introduced for a predetermined time; or if pans are used they may simply be removed from a steam chamber into a smoke chamber without being opened.

Other objects and advantages including faster production at less cost, an arrangement for easy replacement of inexpensive parts and the like will become hereinafter more fully apparent as reference is had to the accompanying drawing wherein my invention is illustrated and in which—

Fig. 1 is a plan view of my improved mold device, partially broken away for illustration;

Fig. 2 is a longitudinal section along the line 2—2 of Fig. 1;

Fig. 3 is a transverse section taken along the line 3—3 of Fig. 1;

Fig. 4 is a view similar to Fig. 3 with the parts separated; and

Fig. 5 is a side elevation of the parts of Fig. 4.

1 indicates the bottom main part of a mold having a plurality of depressions 8 of channel shape therein arranged in an orderly manner, only one of which being shown. The bottom and side walls 9 of each depression are made as an open grill work and may be integral or separable form the main part 1. The shape of each depression 8 is that which is to be imparted to the frankfurter material or other food product as to longitudinal shape, and if the preferred flattened shape is selected, the depression may likewise be that of the finished product vertically. Covering each grill work bottom 9 is a relatively fine removable screen 13.

The raw or partially prepared meat product is placed on top of the screens 13 and pressed to the form of each depression. A screen 14 of planar form is then placed over the entire mold 1 and a second main mold member 12 made of grill work similar to the bottoms 9 is placed over the top of the screen 14.

With this arrangement the screens 13 and 14 prevent the product from being lost through the grill work of the mold members 1 and 2, and the grill work acts to retain the screens in their desired planar or other form.

In order to constitute a linking as well as a forming device, the forming depressions 8 may be separated at regular intervals into individuals depressions by the lower jaws 10 of V-shape carried by mold member 1 for cooperation with upper jaws 11 carried by the upper main mold member 12. The screens 13 and 14 are provided with apertures corresponding respectively with the jaws 10 and 11, and adapted to permit the said jaws to pass therethrough. Thus, when the filled or practically filled casings 15 containing the meat product are inserted in the channels 8 as shown in Figs. 4 and 5, and the cover 12 is placed thereover, pressure on the cover causes the jaws 10 and 11 to form individual links as indicated in Figs. 2 and 3. Since the jaws are in contact with the casing during cooking and smoking, the form will be thereafter retained, thus eliminating the necessity for twisting the links individually.

These jaws 10 and 11 may be suitably made to constitute dowels for the upper and lower main mold members, as best illustrated in Figs. 3 and 4, where it is seen that the outer edges 16 of the jaw 10 enter depressions 17 in the member 12.

It will be noted that the jaws 10 and 11 are individually attached to their respective main members. They can therefore be shifted along the channels to form depressions of different lengths. In this case a multiplicity of small depressions 17 may be provided, or the ears 16 of the jaws 10 may be omitted. The screens 13 and 14 must then be replaced by similar screens having apertures to correspond with the jaws 10 and 11 in their shifted position.

What I claim is:

1. A mold device for preparing frankfurters and the like comprising a metallic plate member having at least one elongated depression in the form of a channel having grill work bottom and side walls and adapted to receive a casing substantially filled with meat products, said channel having jaw members at spaced intervals, a second plate member having grill work adapted to overlie said channel, and jaw members projecting from said second member at intervals for cooperation with the jaw members of the first named plate member whereby said casing is squeezed at intervals along the length thereof into links.

2. A mold device for preparing frankfurters and the like comprising a metallic plate member having at least one elongated depression in the form of a channel having grill work bottom and side walls and adapted to receive a casing substantially filled with meat products, said channel having jaw members at spaced intervals, a second plate member having grill work adapted to overlie said channel, and jaw members projecting from said second member at intervals for cooperation with the jaw members of the first named plate member whereby said casing is squeezed at intervals along the length thereof into links, the jaws of said first named member being of V-shape with the upper edges thereof projecting from the surface of said first plate, said second plate having small depressions to receive said upper edges to constitute dowel means for said plates.

3. A mold device for preparing frankfurters and the like comprising a metallic plate member having at least one elongated channel having grill work bottom and side walls and adapted to receive a casing substantially filled with meat products, said chanel having V-shaped jaw members at spaced intervals, a second plate member having grill work adapted to overlie said channel and the casing therein and also having V-shaped jaws projecting therefrom at spaced intervals for co-operating with the jaws of the first named plate member to form said casing into links, and screens between said casing and the grill work of both of said plate members.

FRANK W. TRABOLD.